(12) United States Patent
Symes et al.

(10) Patent No.: US 6,598,061 B1
(45) Date of Patent: Jul. 22, 2003

(54) SYSTEM AND METHOD FOR PERFORMING MODULAR MULTIPLICATION

(75) Inventors: Dominic Hugo Symes, Cherry Hinton (GB); David James Seal, Cambridge (GB)

(73) Assignee: Arm Limited, Cambridge (GB)

( * ) Notice: Subject to any disclaimer, the term of this patent is extended or adjusted under 35 U.S.C. 154(b) by 494 days.

(21) Appl. No.: 09/594,081

(22) Filed: Jun. 15, 2000

(30) Foreign Application Priority Data

Jul. 21, 1999 (GB) .............................................. 9917137

(51) Int. Cl.[7] ................................................ G06F 7/72
(52) U.S. Cl. ....................................................... 708/491
(58) Field of Search ......................................... 708/491

(56) References Cited

U.S. PATENT DOCUMENTS

| | | | | |
|---|---|---|---|---|
| 5,524,090 A | | 6/1996 | Iwamura | 364/757 |
| 5,742,530 A | * | 4/1998 | Gressel et al. | 708/491 |
| 5,745,398 A | | 4/1998 | Monier | 364/746.1 |
| 6,085,210 A | * | 7/2000 | Buer | 708/491 |
| 6,209,016 B1 | * | 3/2001 | Hobson et al. | 708/491 |
| 6,424,987 B1 | * | 7/2002 | Romain | 708/492 |
| 6,434,585 B2 | * | 8/2002 | McGregor et al. | 708/491 |

FOREIGN PATENT DOCUMENTS

EP 0 947 915 A1 10/1999

* cited by examiner

*Primary Examiner*—David H. Malzahn
(74) *Attorney, Agent, or Firm*—Nixon & Vanderhye P.C.

(57) ABSTRACT

The present invention provides a system, method and computer program for performing a modular multiplication $a*b*2^{-N}$ modulo n, where a, b and n are N-bit integers. The system comprises a multiplier for multiplying a Y-bit number by a Z-bit number, and partitioning logic for partitioning the integer a into a plurality of first sections, each first section being of a size which is a multiple of Y, and for partitioning the integer b into a plurality of second sections, each second section being of a size which is a multiple of Z. A multiplication unit is then provided to apply operations to control the multiplier to perform a sequence of multiplications to multiply one of said first sections by one of said second sections in order to generate a number of output operands for use in subsequent operations performed by the multiplication unit. A controller is used to sequentially input one of said first sections and one of said second sections into the multiplication unit along with predetermined ones of said output operands from preceding operations performed by the multiplication unit, until each first section has been multiplied by each second section. By this approach, a multiplication unit can be provided which is of a fixed size, irrespective of the size of the input integers, a b and n. This alleviates the requirements for increasingly larger fast storage, the size of the fast storage being dependent not on the ultimate size of the N-bit integers, but rather on the predetermined size of the sections into which those integers are partitioned.

12 Claims, 10 Drawing Sheets

SYSTEM AND METHOD FOR PERFORMING MODULAR MULTIPLICATION

BACKGROUND OF THE INVENTION

1. Field of the Invention

The present invention relates to a system and method for performing modular multiplication, and in particular the modular multiplication $a*b*2^{-N}$ modulo n, where a, b and n are N-bit integers with n odd. It will be appreciated that the integers a, b and n may not necessarily require all N-bits to specify the integer, but it is clear that any such numbers can always be specified by N-bits by adding an appropriate number of zeros as the most significant bits of the N-bit number.

2. Description of the Prior Art

There are a number of situations where it is desirable to perform the modular multiplication $a*b*2^{-N}$ modulo n, this particular type of modular multiplication often being referred to as Montgomery multiplication.

One particular implementation which makes use of Montgomery multiplication is RSA encryption/decryption as used in smart cards or other secure devices. RSA requires the rapid modular multiplication of large integers, for example 512 or 1024 bits in length, in order to carry out modular exponentiations. The Montgomery multiplication technique provides an efficient way of producing the modular result by applying corrections to partial products as they are generated and accumulated.

In typical implementations of Montgomery multiplication, the multiplication has to be handled in word lengths of w bits, where w is typically 16 or 32. The Montgomery algorithm requires a (N+w+1) bit storage register "c" for holding and accumulating partial products as they are generated, and a temporary w-bit number m, which is a Montgomery correction factor.

In the following discussion of the Montgomery algorithm, the notation b[j] refers to the j-th w-bit word of b, i.e. b[0] is the least significant w-bit word of b, and b[s−1] is the most significant w-bit word of b, where s=N/w, i.e. the number of words in an N-bit number.

The Montgomery correction factor m makes use of a constant n0p that is derived from the least significant w-bit word of the modulus n[0]. This constant n0p obeys the following relation:

$$n[0]*n0p = -1 \bmod 2^w$$

Given the above, the standard Montgomery algorithm can be represented by the following pseudo code:

```
c:=0 for j=0 to s−1 do
    c:=c+a*b[j]  // calculate and accumulate the partial
                    product
    m:=(c[0]*n0p) mod 2^w  // calculate the montgomery
                    correction factor
    c:=c+n*m  // apply the montgomery reduction
    c:=c>>w   // drop the bottom word of c which is always
                    zero
endfor
result:=c  // the final (N+1) bit result is in c
```

In practice, the a*b[j] and n*m multiplications in the above pseudo code are broken down into fixed size multiply-accumulate (MAC) operations, for example 32×16 bit MAC operations if w=16. This size of MAC is a good balance between maximising data throughput on the one hand and minimising die area and easing timing requirements on the other. However, it will be appreciated that for the Montgomery multiplication to be performed in an efficient manner, the multiplication block must still have access to sufficient fast storage to store the input N-bit integers a, b and n, and the partial products generated, for which N+w+1 bits are required. In a hardware implementation of the multiplication block, the fast storage would typically take the form of hardware registers, whilst in a software implementation the fast storage might take the form of a cache or SRAM.

An example of such a prior art approach is the stand alone RSA coprocessor from SIDSA referred to as the sRSAC2048A, which uses a large bank of 256 32-bit words of onboard memory to hold a maximum of four 2048-bit values.

It will be appreciated that for large N-bit integers, there is hence a requirement for a significant amount of fast storage, and the current trend is for these N-bit numbers to increase in size, thereby further increasing the storage requirements of a system for performing Montgomery multiplication.

SUMMARY OF THE INVENTION

Viewed from a first aspect the present invention provides a system for performing a modular multiplication $a*b*2^{-N}$ modulo n, where a, b and n are N-bit integers, comprising: a multiplier for multiplying a Y-bit number by a Z-bit number; partitioning logic for partitioning the integer a into a plurality of first sections, each first section being of a size which is a multiple of Y, and for partitioning the integer b into a plurality of second sections, each second section being of a size which is a multiple of Z; a multiplication unit for applying operations to control the multiplier to perform a sequence of multiplications to multiply one of said first sections by one of said second sections in order to generate a number of output operands for use in subsequent operations performed by the multiplication unit; a controller for sequentially inputting one of said first sections and one of said second sections into the multiplication unit along with predetermined ones of said output operands from preceding operations performed by the multiplication unit, until each first section has been multiplied by each second section.

In accordance with the present invention, a multiplier is provided for multiplying a Y-bit number by a Z-bit number, and hence for example may be arranged to perform a 32-bit by 16-bit multiplication. Then, in accordance with the present invention, the N-bit integers a and b are partitioned into a plurality of first and second sections, respectively, where each first section is of a size which is a multiple of Y, and each second section is of a size which is a multiple of Z. In preferred embodiments, the partitioning logic used to perform this partitioning is implemented in software.

Further, a multiplication unit is provided which is able to control the multiplier to perform a sequence of multiplications in order to multiply one of the first sections by one of the second sections, with a number of output operands then being generated for use in subsequent operations performed by the multiplication unit. A controller is provided to sequentially input one of the first sections and one of the second sections into the multiplication unit along with predetermined ones of the output operands from preceding operations performed by the multiplication unit, so as to enable each first section to be multiplied by each second section.

By this approach, a multiplication unit can be provided which is of a fixed size, irrespective of the size of the input integers, a b and n. The integers can then be partitioned into a plurality of sections, each section being of a size which can be handled by the multiplication unit, with a controller then being provided to manage the sequence in which the sections are operated upon by the multiplication unit. This approach alleviates the requirements for increasingly larger fast storage, the size of the fast storage being dependent not on the ultimate size of the N-bit integers, but rather on the predetermined size of the sections into which those integers are partitioned.

For example, in one embodiment, the sections into which the N-bit integers are partitioned may be 256 bits in length and accordingly the fast storage, for example hardware registers if the multiplication unit is implemented in hardware, need only to be able to store 256 bit sections of the integers a, b and n, rather than having to store the entire N-bit integers. The entire Montgomery multiplication on the N-bit integers is then performed by calling the multiplication unit several times in a chained fashion under the control of the controller. Hence, if the multiplicand a and multiplier b are 768-bit numbers, and the multiplication unit is arranged to handle 256-bit sections of these numbers, then the multiplication unit can be used to break down the multiplication into a 3×3 array of blocks which are 256×256 bits in size. Similarly, if the multiplicand a and multiplier b are 1024-bit numbers, then the multiplication unit can be used to break down the multiply into a 4×4 array of blocks which are 256×256 bits in size.

Hence, it will be appreciated that not only does the present invention alleviate the increasing requirements for large fast storage, but also enables a multiplication unit of a fixed size to be used irrespective of the size of the N-bit integers. Hence, as the size of these N-bit integers increases, the same multiplication unit can be used, with the controller providing appropriate control to manage the sequential operation of the multiplication unit to perform the required modular multiplication.

It will be appreciated that the first and second sections can be chosen to be any appropriate size suitable for manipulation by the multiplication unit. However, preferably, both the first and second sections are of a size K, where N is a multiple of K.

In preferred embodiments, the output operands include a row accumulator value, such that if a first section V other than the first section representing the least significant bits of integer a is multiplied by a second section W other than the second section representing the most significant bits of integer b, then the row accumulator value generated is output for use in a subsequent operation performed by the multiplication unit to multiply a first section V−1 by a second section W+1.

Further, in preferred embodiments, the output operands include a column carry value, such that if a first section V other than the first section representing the most significant bits of integer a is multiplied by a second section W, then the column carry value generated is output for use in a subsequent operation performed by the multiplication unit to multiply a first section V+1 by the second section W.

Preferably, the partitioning logic is further arranged to partition the integer n into a plurality of third sections, each third section being of a size which is a multiple of Y, and the multiplication unit is arranged to control the multiplier to perform a sequence of multiplications to multiply one of said third sections by a correction value.

Typically, the first sections and third sections are of the same size. In this embodiment, the correction value is calculated to be the same size as the second section.

In preferred embodiments, when the multiplication unit is causing a multiplication to be performed involving the first section representing the least significant bits of the integer a, the multiplication unit is arranged to calculate the correction value to have a value such that the row accumulator value output by the multiplication unit has a value of zero.

Then, preferably, for a particular second section, the same correction value is used when the multiplication unit is causing that second section to be multiplied by any of the first sections.

The multiplication unit may be embodied in hardware, or alternatively may be embodied by software used to control the multiplier. However, in preferred embodiments, the multiplication unit is implemented in hardware, and comprises the multiplier and a number of registers for storing the first and second sections provided by the controller and the output operands generated during the operations performed by the multiplication unit.

Viewed from a second aspect, the present invention provides a method of performing a modular multiplication $a*b*2^{-N}$ modulo n, where a, b and n are N-bit integers, comprising the steps of: (a) providing a multiplier for multiplying a Y-bit number by a Z-bit number; (b) partitioning the integer a into a plurality of first sections, each first section being of a size which is a multiple of Y; (c) partitioning the integer b into a plurality of second sections, each second section being of a size which is a multiple of Z; (d) employing a multiplication unit to apply operations to control the multiplier to perform a sequence of multiplications to multiply one of said first sections by one of said second sections in order to generate a number of output operands for use in subsequent operations performed by the multiplication unit; (e) sequentially inputting one of said first sections and one of said second sections into the multiplication unit along with predetermined ones of said output operands from preceding operations performed by the multiplication unit, and repeating the step (d), until each first section has been multiplied by each second section.

Viewed from a third aspect, the present invention provides a computer program, or a computer program product, for operating a computer system to perform a modular multiplication $a*b*2^{-N}$ modulo n, where a, b and n are N-bit integers, the computer system having a multiplier for multiplying a Y-bit number by a Z-bit number; the computer program comprising: a partitioning routine configured in operation to partition the integer a into a plurality of first sections, each first section being of a size which is a multiple of Y, and to partition the integer b into a plurality of second sections, each second section being of a size which is a multiple of Z; a controller for managing the operation of a multiplication unit arranged to apply operations to control the multiplier to perform a sequence of multiplications to multiply one of said first sections by one of said second sections in order to generate a number of output operands for use in subsequent operations performed by the multiplication unit; the controller being configured in operation to sequentially input one of said first sections and one of said second sections into the multiplication unit along with predetermined ones of said output operands from preceding operations performed by the multiplication unit, until each first section has been multiplied by each second section.

As mentioned previously, the multiplication unit may be embodied in either hardware or software. However, if embodied in software, then in preferred embodiments the computer program further comprises the multiplication unit.

BRIEF DESCRIPTION OF THE DRAWINGS

The present invention will be described further, by way of example only, with reference to a preferred embodiment thereof as illustrated in the accompanying drawings, in which.

DESCRIPTION OF A PREFERRED EMBODIMENT

Figure 1:
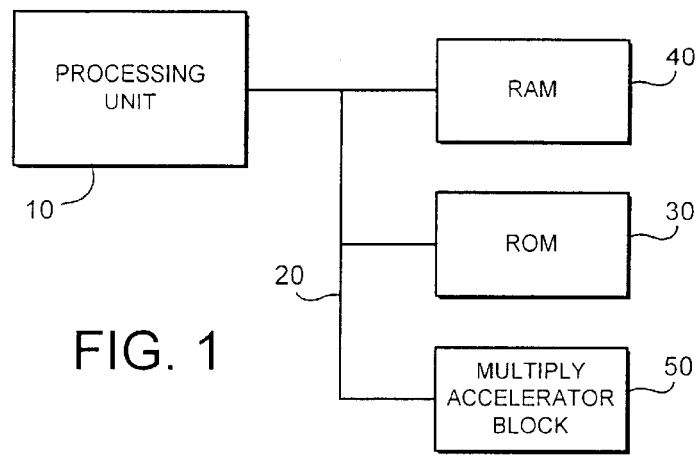
FIG. 1 is a block diagram of a system in accordance with a preferred embodiment of the present invention.

FIG. 1 is a block diagram illustrating a system in accordance with a preferred embodiment of the present invention. In accordance with this embodiment, a processing unit 10, such as a CPU, is connected via bus 20 to a Read Only Memory (ROM) 30 and a Random Access Memory (RAM) 40. Software to be run by the processing unit 10 may be stored within the ROM 30, whilst the RAM 40 may be used as workspace memory for storing the values of parameters manipulated by the processing unit 10. In preferred embodiments, this data processing apparatus is used to perform Montgomery multiplication on large N-bit integers, and hence might typically be used for RSA encryption/decryption as used in smart cards or other secure devices. In preferred embodiments, a separate hardware Montgomery multiplication unit 50, also referred to herein as a multiply accelerator block, is used to apply operations to sections of the input operands. The processing unit 10, operating software stored in the ROM 30, is then used to control the multiplication unit 50 to perform Montgomery multiplication by a chained sequence of multiplications performed on sections of the input operands within the multiplication unit 50.

It should be noted that, in alternative embodiments, the Montgomery multiplication unit 50 might be implemented by software routines stored, for example, in the ROM 30, and in this embodiment the processing unit 10 would preferably have access to a basic multiplier, for example for multiplying a 32-bit number by a 16-bit number, and some fast storage such as an SRAM or cache for storing the sections of the input operands used, and the output operands generated, by the software multiplication unit. However, for the purpose of the following description, it will be assumed that the multiplication unit is embodied in hardware by appropriate connection of hardware registers to a multiplier. An example implementation of the multiplication unit 50 is illustrated in FIG. 2.

Figure 2:
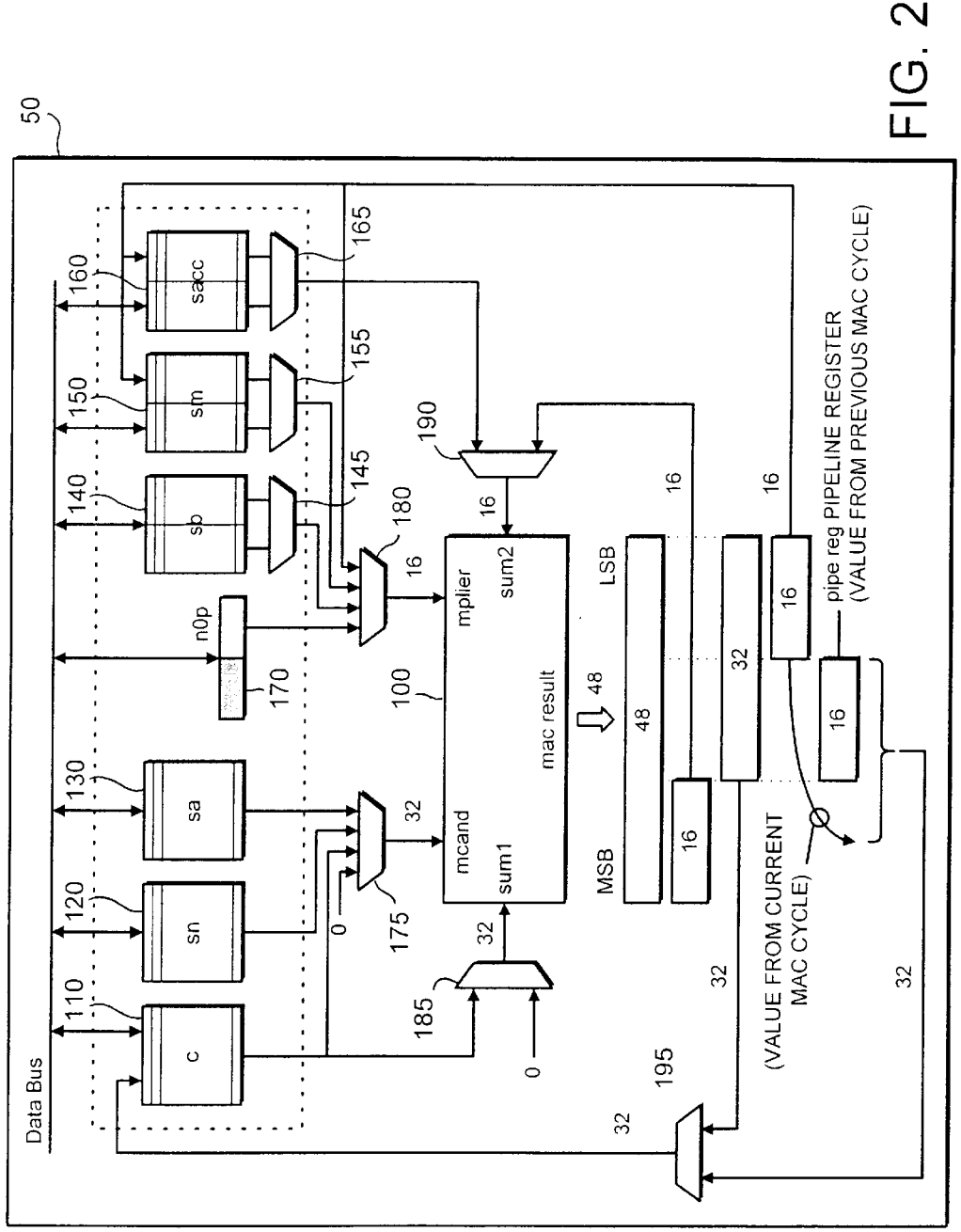
FIG. 2 illustrates the data paths within the multiplication unit in accordance with preferred embodiments of the present invention.

The multiply accelerator block 50 illustrated in FIG. 2 is in preferred embodiments of size K-bits, and has the following "state":

| | |
|---|---|
| A K-bit number sa | (section of a) |
| A K-bit number sb | (section of b) |
| A K-bit number sn | (section of n) |
| A K-bit number sm | (section of m) |
| A K-bit number sacc | (row accumulator) |
| A (K + 17)-bit number c | (column carry) |
| A 1-bit flag NR | (new row flag) |
| A 16-bit number n0p | (constant derived from modulus n) |

Accordingly, the multiply accelerator block 50 has a number of sets of pipelined registers 110, 120, 130, 140, 150 and 160 for storing the values of c, sn, sa, sb, sm and sacc, respectively. A further register 170 is also provided for storing a constant n0p, that, as mentioned earlier, is derived from the least significant w-bit word of the modulus n[0].

Figure 3:
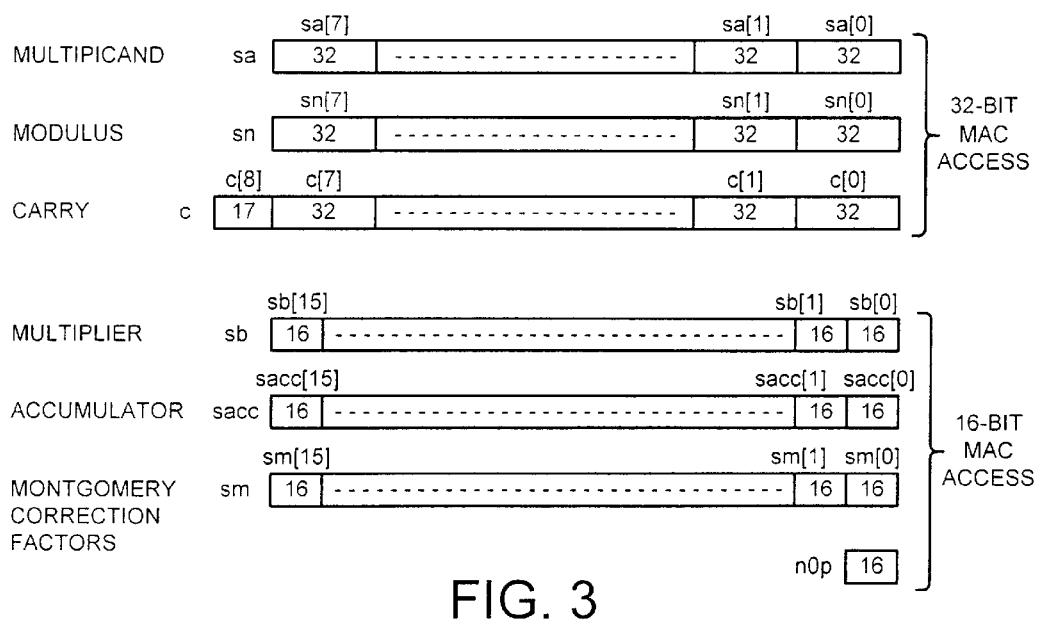
FIG. 3 illustrates in more detail the operand and working registers of the multiplication unit illustrated in FIG. 2.

FIG. 3 illustrates in more detail the contents of these registers. In preferred embodiments, the size K of the values handled by the multiply accelerator block 50 is chosen to be 256 bits, and accordingly the registers for the input operands sa, sn and sb are 256 bits in length. Similarly, the registers for the values sacc and sm are also 256 bits in length, whilst the register for the carry value c is actually 273 bits in length, since as mentioned earlier the carry register c needs to be N+w+1 bits in length, where here w=16.

As shown in FIG. 3, and as evident from FIG. 2, the values sa, sn and c are input to the multiply accumulate (MAC) block 100 in 32-bit portions, and accordingly sa and sn are written into the registers 130 and 120, respectively, in eight 32-bit portions. Similarly, the value of c is stored in its associated register 110 in 32-bit portions.

As also evident from FIG. 3, the values sb, sacc, sm and n0p are all provided to the MAC block 100 in 16-bit portions, and hence the values sb, sacc and sm are written into their respective registers 140, 160 and 150 as sixteen separate 16-bit portions. As illustrated in FIG. 2, this can actually be achieved using eight 32-bit wide registers, with multiplexers 145, 155 and 165 being provided at the output of the registers to select either the upper 16 bits or the lower 16 bits as required.

The flow of the data paths as illustrated in FIG. 2 will be discussed in more detail later with reference to the flow diagrams of FIGS. 7 to 12.

Figure 4:
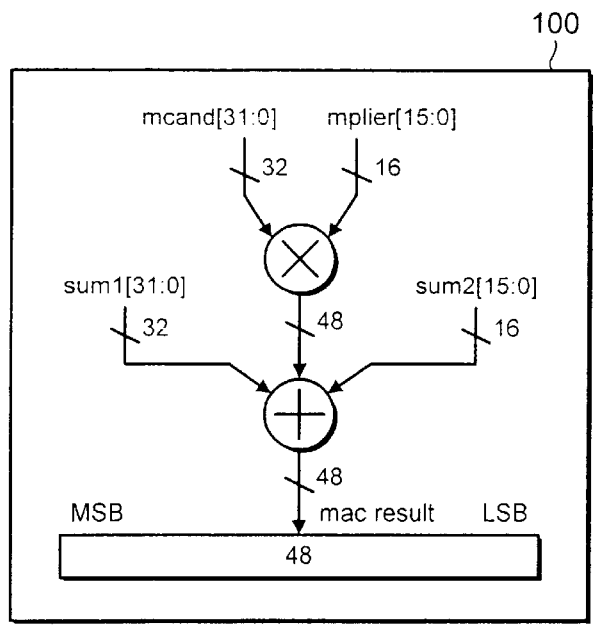
FIG. 4 illustrates the operation of the multiply-accumulate block within the multiplication unit of FIG. 2.

The basic operation of the MAC unit 100 is illustrated in FIG. 4. It will be appreciated that whilst in preferred embodiments a single MAC unit is provided, its function may be implemented in a variety of ways, for example as separate multiplier and adder blocks which are controlled to cause them to perform the desired multiply-add operations. As illustrated in FIG. 4, the MAC unit 100 multiplies an unsigned 32-bit multiplicand (mcand) with an unsigned 16-bit multiplier (mplier) and adds into the result an unsigned 32-bit integer (sum1) and an unsigned 16-bit integer (sum2) to produce a 48-bit result (macresult), all in a single clock cycle. Accordingly, macresult can be represented by the equation:

$$macresult = mcand * mplier + sum1 + sum2$$

Different segments of the 48-bit result are used during various operations. The 48-bit result can never overflow as is shown by the following argument.

The maximum value of mcand and mplier is $2^{32}-1$ and $2^{16}-1$, respectively. Therefore, the maximum multiplier output is:

$$(2^{32}-1)*(2^{16}-1) = 2^{48} - 2^{32} - 2^{16} + 1$$

Adding in the maximum values of sum1 and sum2:

$$(2^{48}-2^{16}-2^{32}+1)+2^{32}-1+2^{16}-1=2^{48}-1$$

Hence, the maximum value of macresult is exactly equal to a full-scale 48-bit number.

Figure 5:
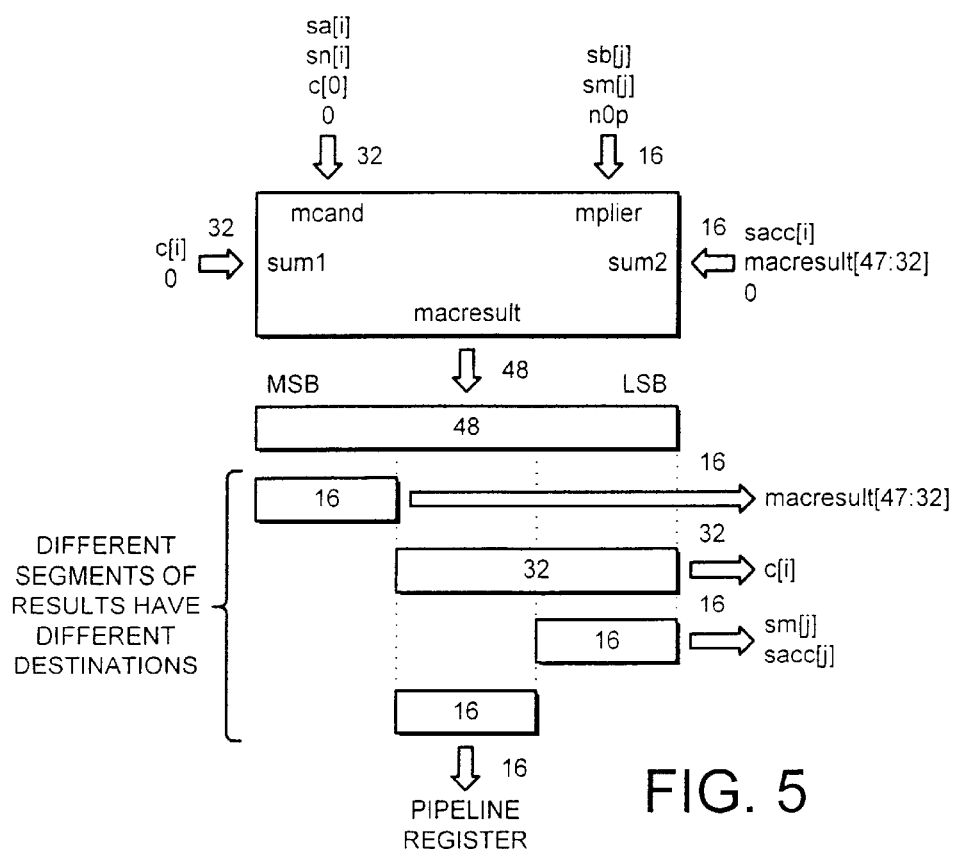
FIG. 5 illustrates the source and destination data for the various ports of the multiply-accumulate block within the multiplication unit of FIG. 2.

FIG. 5 schematically illustrates the possible sources of register data for the MAC input ports, and the destinations for the parts of the result port outputting the value of macresult. The use of the various parts of the value macresult will be discussed in more detail with reference to the flow diagrams of FIGS. 7 to 12.

Figure 6:
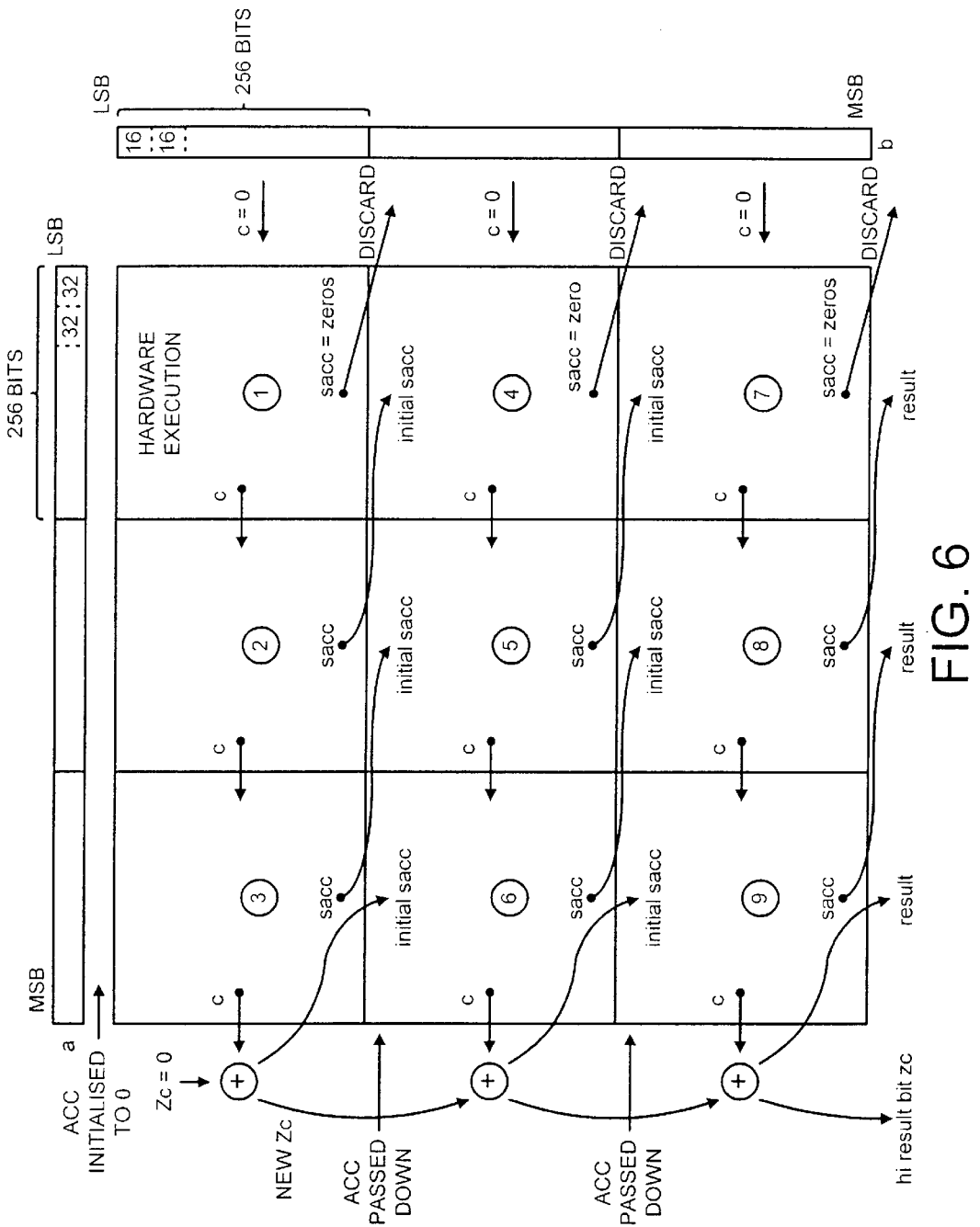
FIG. 6 illustrates how the system of preferred embodiments can be used to chain together multiplication blocks.

Before discussing in detail the operation of the data processing apparatus of preferred embodiments of the present invention, reference will be made to FIG. 6, which schematically illustrates how the multiply accelerator block 50 is cycled under software control to build up the final modular multiplication result. In this example, the inputs a, b and n to the Montgomery multiply apparatus are 768-bit numbers, and the multiply accelerator block 50 is configured to work on 256-bit sections at a time. FIG. 6 illustrates how the values of the output operands in the registers c and sacc at the end of any particular sequence of operations performed by the multiply accelerator block 50 are used in subsequent operations. This will be discussed in more detail with reference to the flow diagrams of FIGS. 7 to 12.

A call to the multiply accelerator block 50 of preferred embodiments results in the following function being implemented (the parameter NR is used to specify a new row, and is set to a value of 1 when a new row is started—e.g. with reference to FIG. 6, NR will be set equal to 1 for stages 1, 4 and 7):

If NR=0 then:

temp=c+sacc+sa*sb+sn*sm sacc=bits 0 to K−1 of temp c=bits K to 2K of temp

If NR=1 then:

The value of sm on entry is ignored. Instead sm is set to a value such that sacc=0 in the above calculation. Ie:

sm is set so that:

(c+sacc+sa*sb+sn*sm)==0 mod $2^k$ then set:

c=bits K to 2K of (c+sacc+sa*sb+sn*sm)

As mentioned earlier, in the preferred embodiments of the present invention, the register c is increased to K+17 bits in length, and an extra 16-bit state value n0p is provided. n0p is written with the (unique) 16-bit value such that:

n*n0p=−1 modulo $2^{16}$.

For the purpose of describing the preferred embodiment of the present invention, it is assumed that K is a multiple of 32. A parameter Ca is then set equal to K/32, whilst a parameter Cb is set equal to K/16. For x being any of sa, sn or c, the expression x[i] will be used in the following flow diagrams to refer to the i-th 32-bit portion of x. Similarly, for y being any of sb, sm or sacc, the expression y[j] will be used to refer to the j-th 16-bit portion of y. The multiply accelerator block 50 then operates as shown in the flow diagrams of FIGS. 7 to 10.

Figure 7:
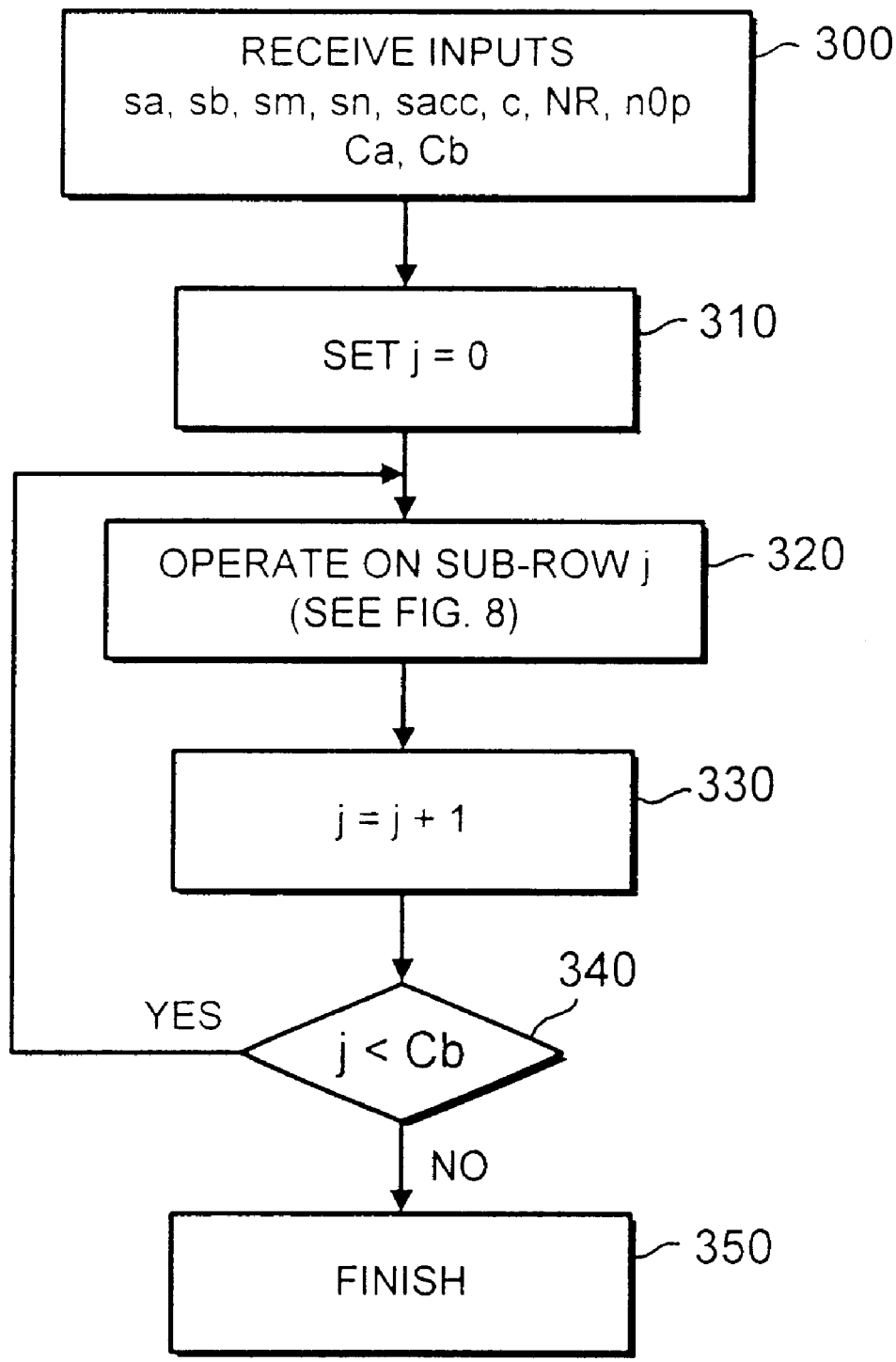
FIGS. 7 to 10 are flow diagrams illustrating the operation of the multiplication unit of preferred embodiments of the present invention.

As shown in FIG. 7, the first stage is that the multiply accelerator block 50 receives the inputs sa, sb, sm, sn, sacc, c, NR, n0p, Ca and Cb. Then, at step 310, the variable j is set equal to zero to select the first 16-bit sub row of the 256×256 block being operated upon by the multiply accelerator block. Hence, with reference to FIG. 6, in the first iteration, the multiply accelerator block will be arranged to operate on the 256×256 block 1 illustrated in the top right hand corner of FIG. 6, and at step 310 will select the first 16-bit wide sub row.

The process then proceeds to step 320, where an operation is performed on sub row j, this process being illustrated in more detail with reference to FIG. 8.

Figure 8:
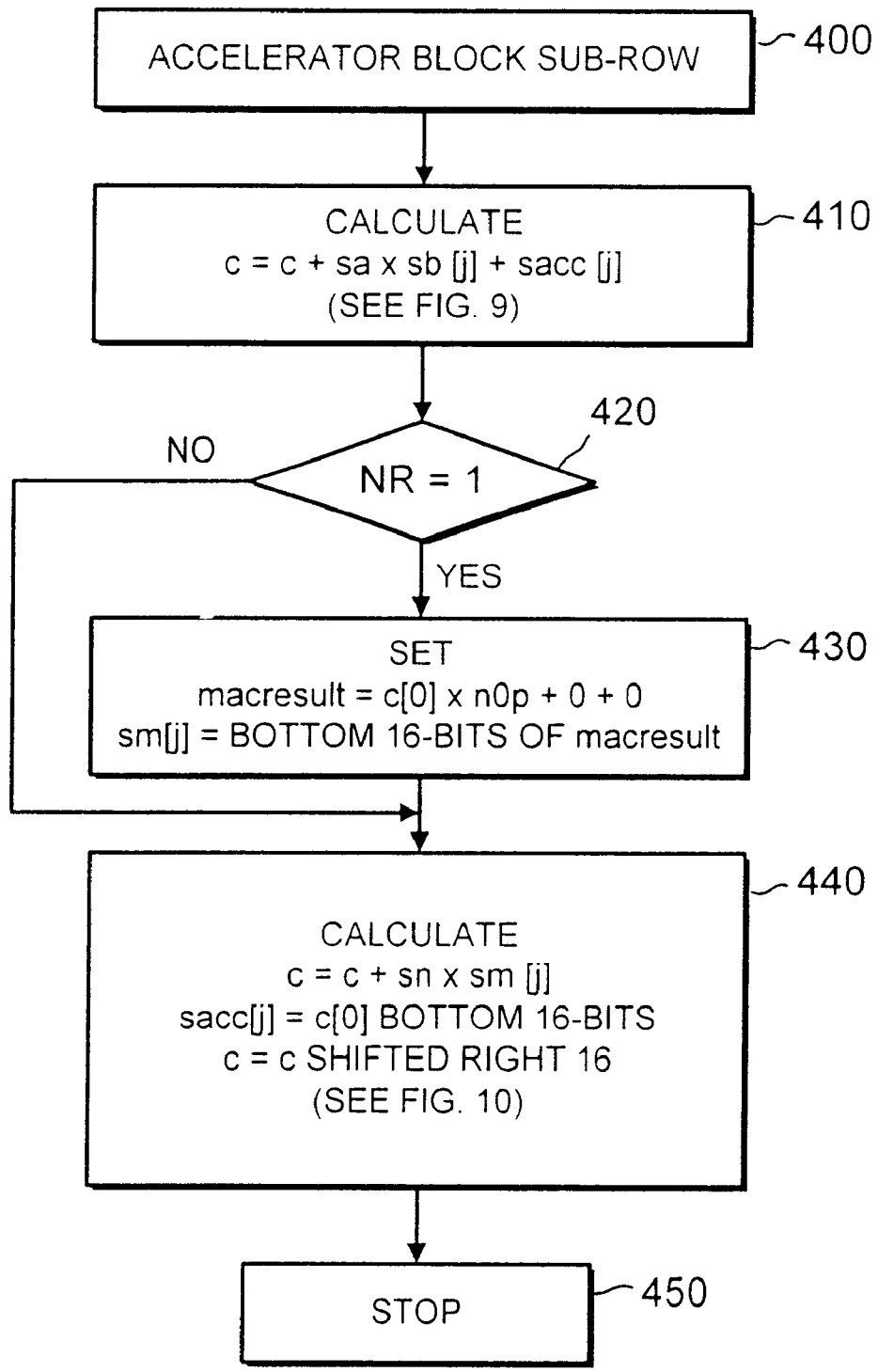

As illustrated in FIG. 8 the operation to be performed on an accelerator block sub row j is initiated at step 400, and proceeds to step 410, where the following calculation is performed:

$$c=c+sa\times sb[j]+sacc[j]$$

Figure 9:
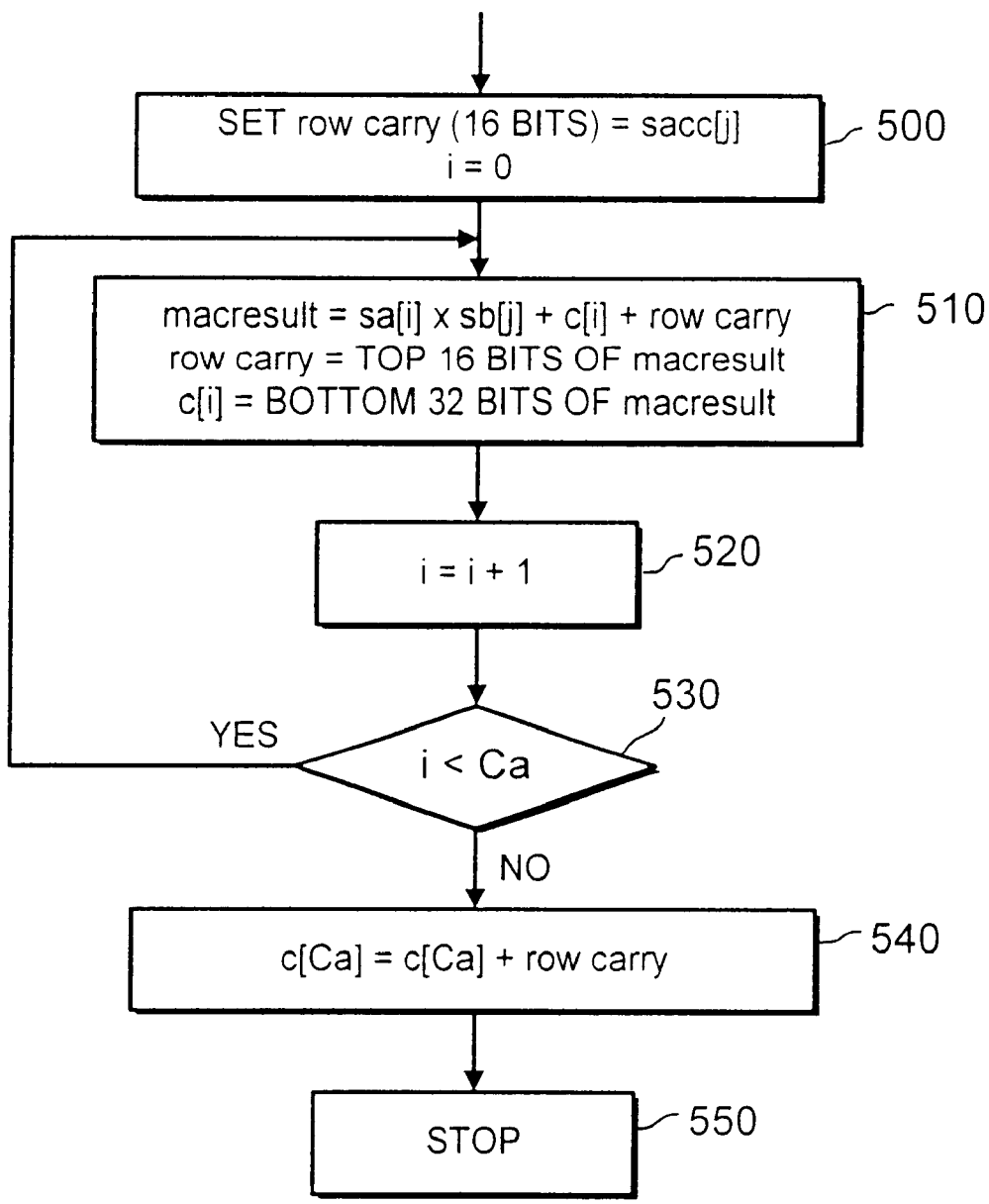

The manner in which this calculation is performed is illustrated in more detail with reference to FIG. 9. As illustrated in FIG. 9, at step 500, a parameter rowcarry is set equal to sacc[j], and i is set equal to zero. Then, at step 510, the following calculation is performed within the MAC unit 100:

$$macresult=sa[i]\times sb[j]+c[i]+\text{rowcarry}$$

With reference to FIGS. 2 and 5, it can be seen that this operation may be performed by inputting sa[i] as the input mcand via the multiplexer 175, inputting sb[j] via the multiplexers 145 and 180 as input mplier, inputting c[i] as the input sum1 via multiplexer 185, and inputting sacc[j] as input sum2 via multiplexers 165 and 190.

The parameter rowcarry is then updated to be the top 16 bits of macresult, which from FIGS. 2 and 5 can be seen to be returned to an input of the multiplexer 190, whilst c[i] is updated to be equal to the bottom 32 bits of macresult, which as can be seen from FIGS. 2 and 5 is returned via multiplexer 195 to the register 110.

The process then proceeds to step 520, where i is incremented by 1, and then at step 530 it is determined whether i is less than Ca, i.e. whether there are any more 32-bit sections of sa to be operated upon. If there are, the process returns to step 510, whereas if i is not less than Ca, the process proceeds to step 540, where the following calculation is performed within the MAC block 100:

$$c[Ca]=c[Ca]+\text{rowcarry}$$

This process is used to add the value of rowcarry back onto the current value of c.

The process then ends at step 550, thereby completing the calculation set out in block 410 of FIG. 8.

Hence, returning to FIG. 8, the process now proceeds to step 420, where it is determined whether the value of NR is equal to 1, indicating that the multiply accelerator block is dealing with a new row (e.g. with reference to FIG. 6, it is determined whether blocks 1, 4 or 7 are being operated upon). If NR does equal 1, then the process proceeds to step 430, in order to calculate a value for sm[j]. To do this, the MAC block 100 is arranged to perform the operation:

$$macresult=c[0]\times n0p+0+0$$

With reference to FIG. 2, it can be seen that this equation can be performed by inputting c[0] as the input mcand via multiplexer 175, whilst inputting n0p as the input mplier via the multiplexer 180. The value of sm[j] is then given by the bottom 16-bits of macresult, which as can be seen from FIGS. 2 and 5 is returned to the register 150.

The process then proceeds to step 440, or proceeds directly from step 420 to 440, if NR does not equal 1. At block 440, the following calculation is performed:

$$c=c+sn*sm[j]$$

The parameter sacc[j] is set equal to the bottom 16 bits of c, and c is then set equal to the previous value of c shifted right by 16 bits.

The manner in which this calculation is performed is described in more detail with reference to FIG. 10.

Figure 10:
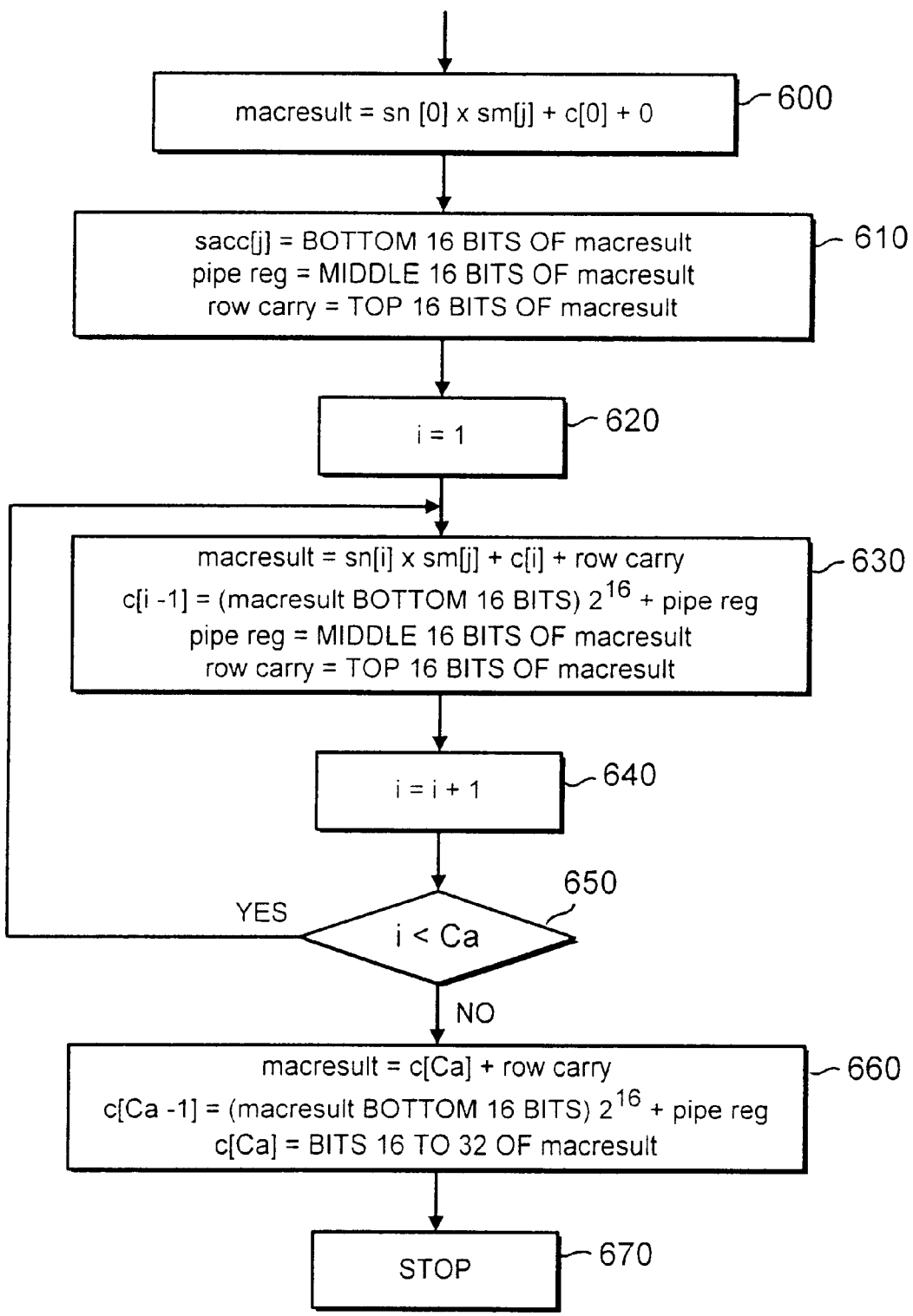

As illustrated in FIG. 10, at step 600 the following calculation is performed:

$$macresult = sn[0] \times sm[j] + c[0] + 0$$

As is apparent from FIG. 2, this calculation can be performed within the MAC block 100 by inputting sn[0] as the input mcand via multiplexer 175, inputting sm[j] as input mplier via multiplexers 155 and 180, and inputting c[0] as input sum1 via multiplexer 185.

Then, at step 610, and as illustrated in FIGS. 2 and 5, sacc[j] is set equal to the bottom 16-bits of macresult, with this value being returned to the register 160, a parameter pipereg is set equal to the middle 16 bits of macresult, and the parameter rowcarry is set equal to the top 16 bits of macresult, and input to the multiplexer 190.

The process then proceeds to step 620, where i is set equal to 1, the process then proceeding to step 630, where the following calculation is performed:

$$macresult = sn[i] \times sm[j] + c[i] + rowcarry$$

As can be seen from FIG. 2, this calculation can be performed by the MAC block 100 by inputting sn[i] as the input mcand via multiplexer 175, inputting sm[j] as the input mplier via multiplexers 155 and 180, inputting c[i] as the input sum1 via multiplexer 185, and inputting rowcarry as the input sum2 via multiplexer 190. The value c[i−1] is then updated to be equal to the bottom 16 bits of the macresult multiplied by $2^{16}$ and added to pipereg, as illustrated in FIG. 2, this value being returned via the multiplexer 195 to the register 110.

The value of pipereg is then updated to be equal to the middle 16 bits of macresult, whilst the value of rowcarry is updated to be equal to the top 16 bits of macresult.

At step 640, i is incremented by 1, and at step 650 it is determined whether i is less than Ca. If it is, then the process returns to step 630, whereas if i is not less than Ca, this means that all 32-bit sections of sn have been processed, and accordingly the process proceeds to step 660.

At step 660, the value of macresult is updated to be equal to c[Ca] +rowcarry, this operation being performed by the MAC block 100 by inputting the value of c[Ca] as input sum1, and inputting rowcarry as input sum2.

Then the value of c[Ca−1] is updated to be equal to the bottom 16 bits of the macresult multiplied by $2^{16}$, and added to the current value of pipereg. As mentioned earlier, and as evident from FIG. 2, this value is then returned to the register 110 via multiplexer 195. The value of c[Ca] is then set equal to bits 16 to 33 of macresult, this value being 0 or 1. The process then terminates at step 670, thereby completing step 440 of FIG. 8. The process of FIG. 8 then terminates at step 450.

Hence, at this stage, step 320 in FIG. 7 has been completed, and the required operation has been performed on the sub row j within a particular 256×256 block being handled by the multiply accelerator block 50. The process now needs to be repeated for each sub row, and accordingly at step 330, j is incremented by 1, and then it is determined whether j is less than Cb. If it is, then the process returns to step 320 to cause the same sequence of operations to be performed on the next sub row. If j is not less than Cb, then all sub rows have been operated upon, and accordingly the process proceeds to step 350 where the operation of the multiply accelerator block 50 is completed for the particular 256×256 block in question.

Having described how the multiply accelerator block 50 operates on a particular 256×256 block in accordance with preferred embodiments of the present invention, the way in which the operation of the multiply accelerator block 50 is then chained together to cause the entire modular multiplication to be performed will now be discussed with reference to the flow diagrams of FIGS. 11 and 12.

At step 700, the parameters a, b, n, z and n0p are established, z being intended to hold a result of the modular multiplication $a*b*2^{-N}$ modulo n.

At step 710, the value of z is set equal to zero, and zc is also set equal to zero, zc being a 1-bit flag indicated by the 1-bit carry from z. At step 720, the parameter Ca is set equal to K/32, whilst at step 730, the parameter Cb is set equal to K/16. Then, at step 740 a parameter J is set equal to zero.

The process then proceeds to step 750, where an entire row is operated upon, e.g. with reference to FIG. 6, the first row operated upon would be the row made up of blocks 1, 2 and 3.

At step 750, a K-bit value for sm is chosen such that:

$$zc.z + a \times b\{J\} + n \times sm = 0 \bmod 2^K$$

where $zc.z = zc \times 2^N + z$, and where $b\{J\}$ refers to the J-th 256 bit section of b.

Then the following operation is performed to determine the value of zc.z:

$$\text{set } zc.z = (zc.z + a \times b\{J\} + n \times sm)/2^K$$

This process will be described further with reference to FIG. 12. As illustrated in FIG. 12, at step 800 the parameter c is set equal to zero, sb is set equal to b{J}, I is set equal to zero and NR is set equal to 1. Then, at step 810, sa is set equal to a{I}, sn is set equal to n{I} and sacc is set equal to z{I}, where {I} indicates the I-th 256-bit section of a, n or z. The accelerator block 50 is then run at step 820, the process executed here having been described earlier with reference to FIGS. 7 to 10.

Then, at step 825, it is determined whether I equals zero, and if it is, this means that sacc will be equal to zero, and the process proceeds directly to step 840. Otherwise, the process proceeds to step 830, where z{I−1} is set equal to the value of sacc. The process then proceeds to step 840. At step 840, the value of I is incremented by 1, and NR is set equal to zero. Then at step 850, it is determined whether I is less than N/K, and if it is, this indicates that there are additional blocks in the row to be handled by the multiply accelerator block 50. Accordingly, the process then returns to step 810. However, if I is not less than N/K, the process proceeds to step 860, where a value TEMP is set equal to c+zc, and hence will have K+1 bits. z{N/K−1} is then set equal to the bottom K-bits of TEMP, whilst zc is set equal to the top bit of TEMP. The process then ends at step 870, thereby completing the operation performed on the row at step 750 of FIG. 11.

The process then proceeds to step 760, where the value of J is incremented by 1, and it is then determined at step 770 whether J is less than N/K. If it is, then this indicates that there are further rows to be executed upon, and hence the process returns to step 750. Otherwise, the process proceeds to step 780, where it is determined whether zc is equal to zero. If it is, then no further work is required, and the value of z gives the result of the modular multiplication. Accordingly the process stops at step 795. However, if zc is not equal to zero, then at step 790 z is set equal to z−n in order to ensure that z is now an N-bit output. It will be appreciated that, since z holds a result for $a*b*2^{-N}$ modulo n, subtracting n from the result will still give a valid result for $a*b*2^{-N}$ modulo n. Then the process terminates at step 795.

The above description of the preferred embodiment has been based on a situation where N is a multiple of K. However, in preferred embodiments the values Ca and Cb are configurable in the multiplication unit 50. The value of Ca can be set in the range 1 to K/32 (inclusive) and Cb in the range 1 to K/16 (inclusive). This extra flexibility enables the multiplication unit 50, with action described by FIGS. 7 to 10, to handle the case where N is not a multiple of K (though N is a multiple of 32). The partitioning logic illustrated by FIGS. 11 and 12 requires modification for the case where N is not a multiple of K as described below.

Figure 11:
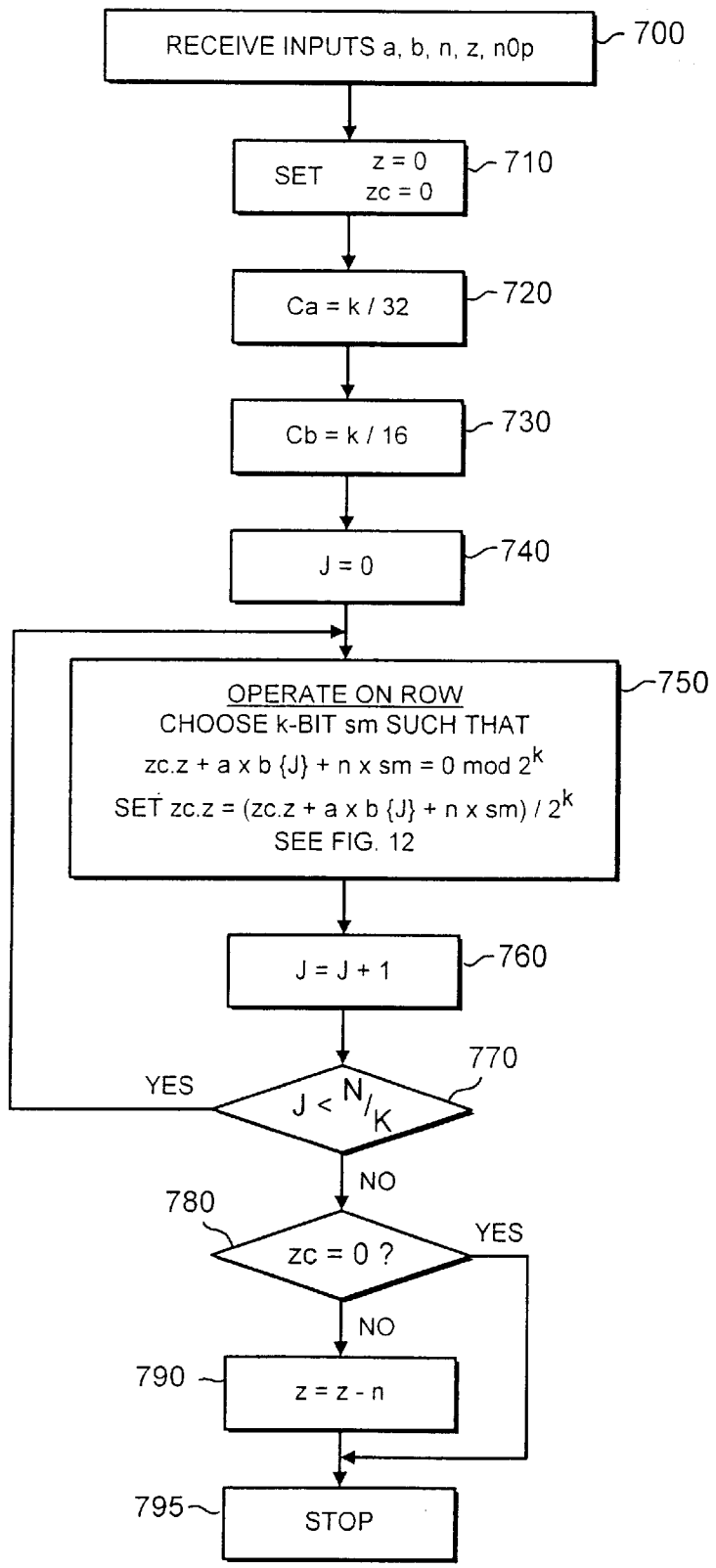
FIGS. 11 and 12 are flow diagrams illustrating the operation used to chain together multiplication blocks in order to perform the entire modular multiplication on N-bit numbers a, b and n.
Figure 12:
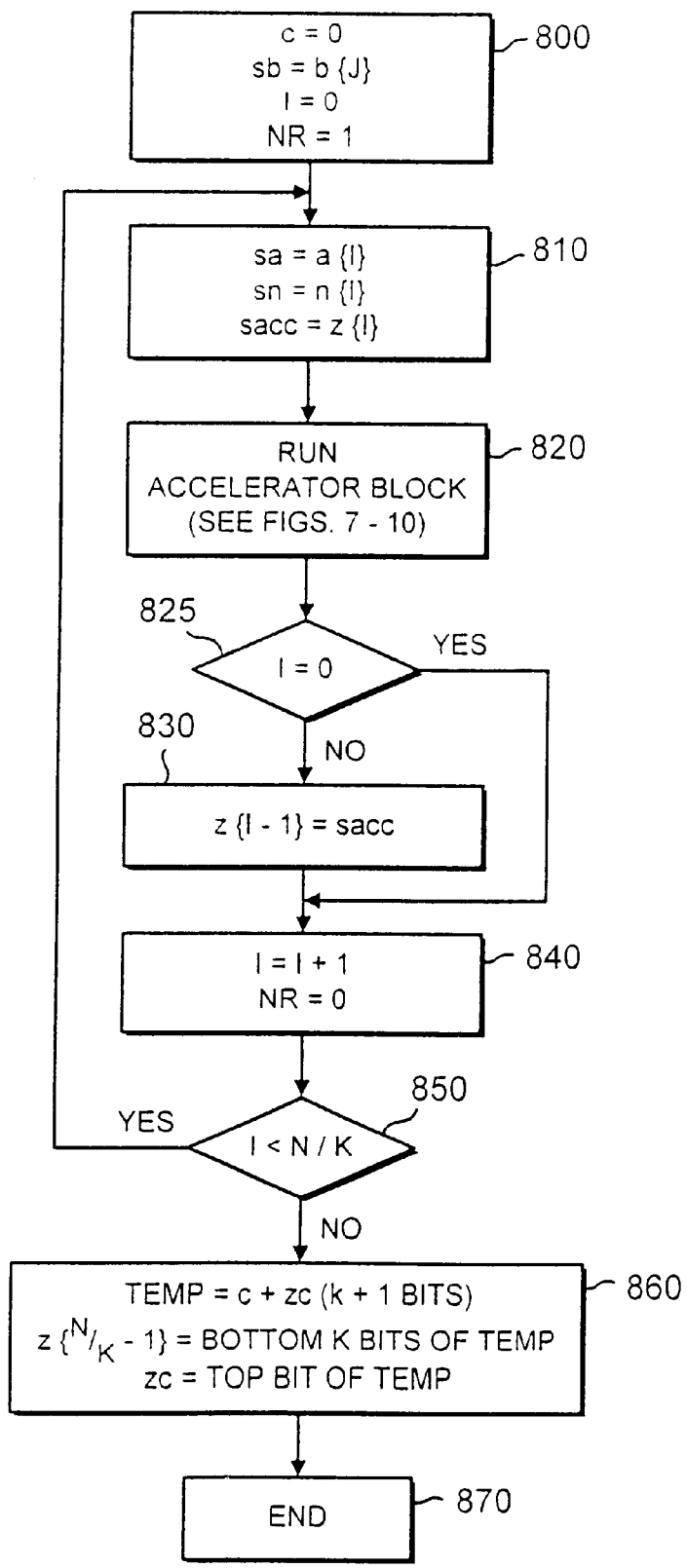

FIG. 6 illustrates the algorithm of FIGS. 11 and 12. In the case that N is not a multiple of K, it will be appreciated that the blocks at the end of a row and end of a column (blocks 3, 6, 7, 8, 9 in FIG. 6) will not be full size blocks. In fact, if R is the remainder after dividing N by K then the blocks at the end of a row will be of size R×K bits, at the end of a column K×R bits, and at the bottom left corner block, R×R bits. To complete the N×N modulo multiply it will now be described what special action must be performed for these incomplete blocks. The remainder of the algorithm is as described in FIGS. 11 and 12.

For a general block of size L×M bits, where L and M are multiples of 32 less than or equal to K, set Ca to be L/32, and Cb to be M/16 when calling the multiply accelerator block in step 820 of FIG. 12.

Modify step 800 to set sb to the next M bits of b. Modify step 810 to set sa, sn, sacc to the next L bits of a, n, z respectively.

Step 810 requires additional functionality if the block is not square (L is not equal to M). If L<M, which is the case at the end of a row, then set bits L to M−1 of sacc to bits L to M−1 of c, set bits L to L+31 of c to the value of zc and set zc to bit M of c. If L>M, which is the case at the end of a column, then add bits M to L−1 of sacc to bits M to L+16 of c (these bits of c will contain 0 or 1 in this case).

Modify step 830 to write the bottom M bits of sacc into z. If M<L then modify step 840 to shift c down by (L−M) bits, writing the (L−M) shifted out bits into z.

Modify step 860 to set TEMP to zc+the lower L+1 bits of c. Write the bottom L bits of TEMP to z, and the top bit of TEMP to zc.

This completes the algorithm modifications required when N is a multiple of 32 but is not a multiple of K.

Although a particular embodiment of the invention has been described herewith, it will be apparent that the invention is not limited thereto, and that many modifications and additions may be made within the scope of the invention. For example, various combinations of the features of the following dependent claims could be made with the features of the independent claims without departing from the scope of the present invention.

We claim:

1. A system for performing a modular multiplication $a*b*2^{-N}$ modulo n, where a, b and n are N-bit integers, comprising:

a multiplier for multiplying a Y-bit number by a Z-bit number;

partitioning logic for partitioning the integer a into a plurality of first sections, each first section being of a size which is a multiple of Y, and for partitioning the integer b into a plurality of second sections, each second section being of a size which is a multiple of Z;

a multiplication unit for applying operations to control the multiplier to perform a sequence of multiplications to multiply one of said first sections by one of said second sections in order to generate a number of output operands for use in subsequent operations performed by the multiplication unit;

a controller for sequentially inputting one of said first sections and one of said second sections into the multiplication unit along with predetermined ones of said output operands from preceding operations performed by the multiplication unit, until each first section has been multiplied by each second section.

2. A system as claimed in claim 1, wherein both the first and second sections are of a size K, where N is a multiple of K.

3. A system as claimed in claim 1, wherein the output operands include a row accumulator value, such that if a first section V other than the first section representing the least significant bits of integer a is multiplied by a second section W other than the second section representing the most significant bits of integer b, then the row accumulator value generated is output for use in a subsequent operation performed by the multiplication unit to multiply a first section V−1 by a second section W+1.

4. A system as claimed in claim 1, wherein the output operands include a column carry value, such that if a first section V other than the first section representing the most significant bits of integer a is multiplied by a second section W, then the column carry value generated is output for use in a subsequent operation performed by the multiplication unit to multiply a first section V+1 by the second section W.

5. A system for performing a modular multiplication $a*b*2^{-N}$ modulo n, where a, b and n are N-bit integers, comprising:

a multiplier for multiplying a Y-bit number by a Z-bit number;

partitioning logic for partitioning the integer a into a plurality of first sections, each first section being of a size which is a multiple of Y, and for partitioning the integer b into a plurality of second sections, each second section being of a size which is a multiple of Z;

a multiplication unit for applying operations to control the multiplier to perform a sequence of multiplications to multiply one of said first sections by one of said second sections in order to generate a number of output operands for use in subsequent operations performed by the multiplication unit;

a controller for sequentially inputting one of said first sections and one of said second sections into the multiplication unit along with predetermined ones of said output operands from preceding operations performed by the multiplication unit, until each first section has been multiplied by each second section, wherein the partitioning logic is further arranged to partition the integer n into a plurality of third sections, each third section being of a size which is a multiple of Y, and the multiplication unit is arranged to control the multiplier to perform a sequence of multiplications to multiply one of said third sections by a correction value.

6. A system as claimed in claim 5, wherein the first sections and third sections are of the same size.

7. A system as claimed in claim 5, wherein when the multiplication unit is causing a multiplication to be performed involving the first section representing the least significant bits of the integer a, the multiplication unit is arranged to calculate the correction value to have a value such that the row accumulator value output by the multiplication unit has a value of zero.

8. A system as claimed in claim 7, wherein for a particular second section, the same correction value is used when the multiplication unit is causing that second section to be multiplied by any of the first sections.

9. A system as claimed in claim 1, wherein the multiplication unit comprises the multiplier and a number of registers for storing the first and second sections provided by the controller and the output operands generated during the operations performed by the multiplication unit.

10. A method of performing a modular multiplication $a*b*2^{-N}$ modulo n, where a, b and n are N-bit integers, comprising the steps of:

(a) providing a multiplier for multiplying a Y-bit number by a Z-bit number;

(b) partitioning the integer a into a plurality of first sections, each first section being of a size which is a multiple of Y;

(c) partitioning the integer b into a plurality of second sections, each second section being of a size which is a multiple of Z;

(d) employing a multiplication unit to apply operations to control the multiplier to perform a sequence of multiplications to multiply one of said first sections by one of said second sections in order to generate a number of output operands for use in subsequent operations performed by the multiplication unit;

(e) sequentially inputting one of said first sections and one of said second sections into the multiplication unit along with predetermined ones of said output operands from preceding operations performed by the multiplication unit, and repeating the step (d), until each first section has been multiplied by each second section.

11. A computer program for operating a computer system to perform a modular multiplication $a*b*2^{-N}$ modulo n, where a, b and n are N-bit integers, the computer system having a multiplier for multiplying a Y-bit number by a Z-bit number; the computer program comprising:

a partitioning routine configured in operation to partition the integer a into a plurality of first sections, each first section being of a size which is a multiple of Y, and to partition the integer b into a plurality of second sections, each second section being of a size which is a multiple of Z;

a controller for managing the operation of a multiplication unit arranged to apply operations to control the multiplier to perform a sequence of multiplications to multiply one of said first sections by one of said second sections in order to generate a number of output operands for use in subsequent operations performed by the multiplication unit;

the controller being configured in operation to sequentially input one of said first sections and one of said second sections into the multiplication unit along with predetermined ones of said output operands from preceding operations performed by the multiplication unit, until each first section has been multiplied by each second section.

12. A computer program as claimed in claim 11, wherein the computer program further comprises the multiplication unit.

\* \* \* \* \*